United States Patent Office 3,170,318
Patented Feb. 23, 1965

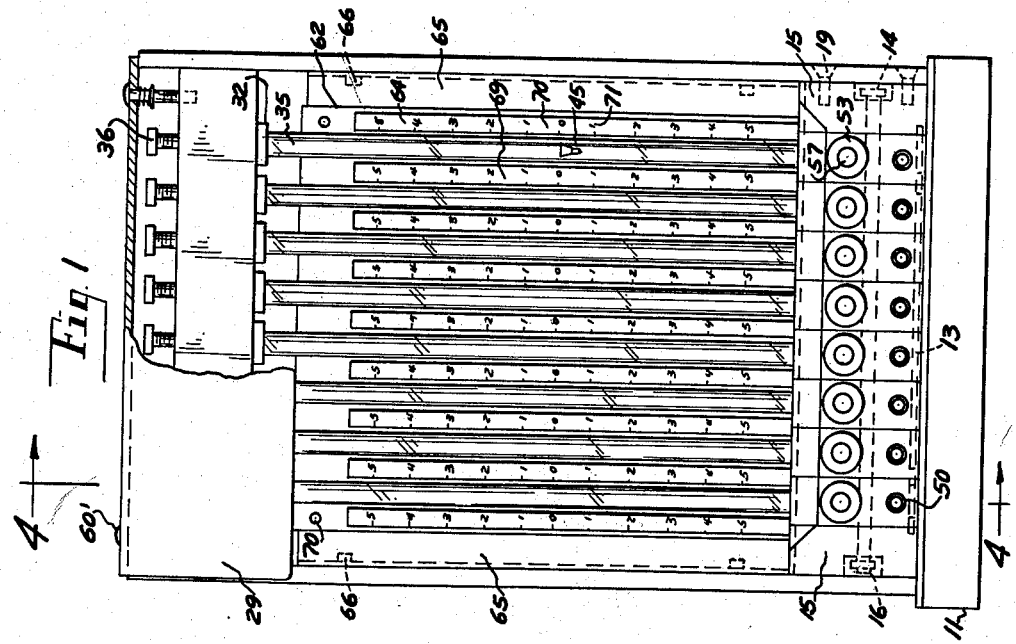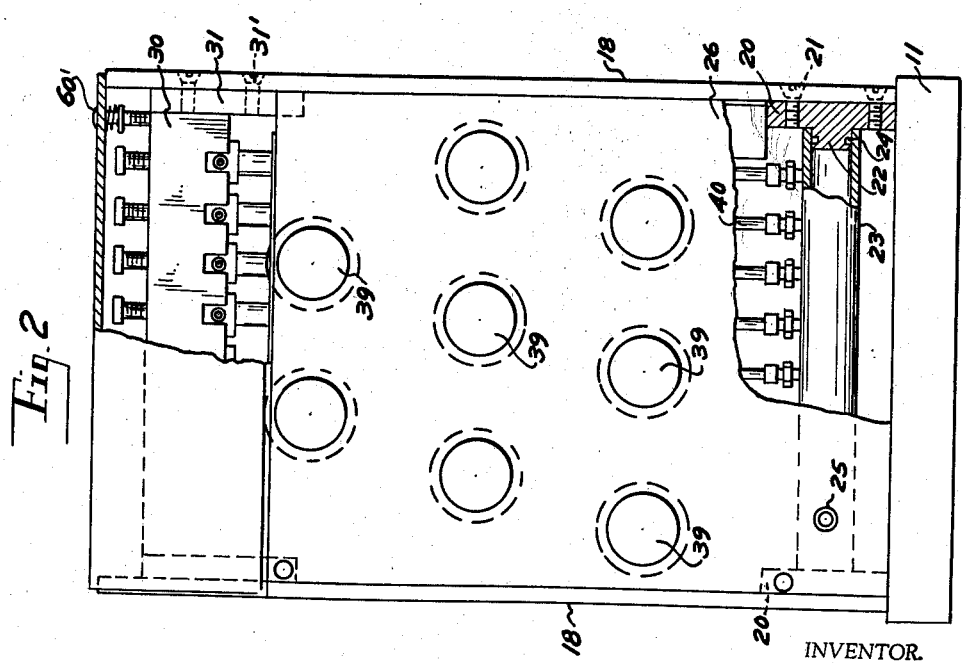

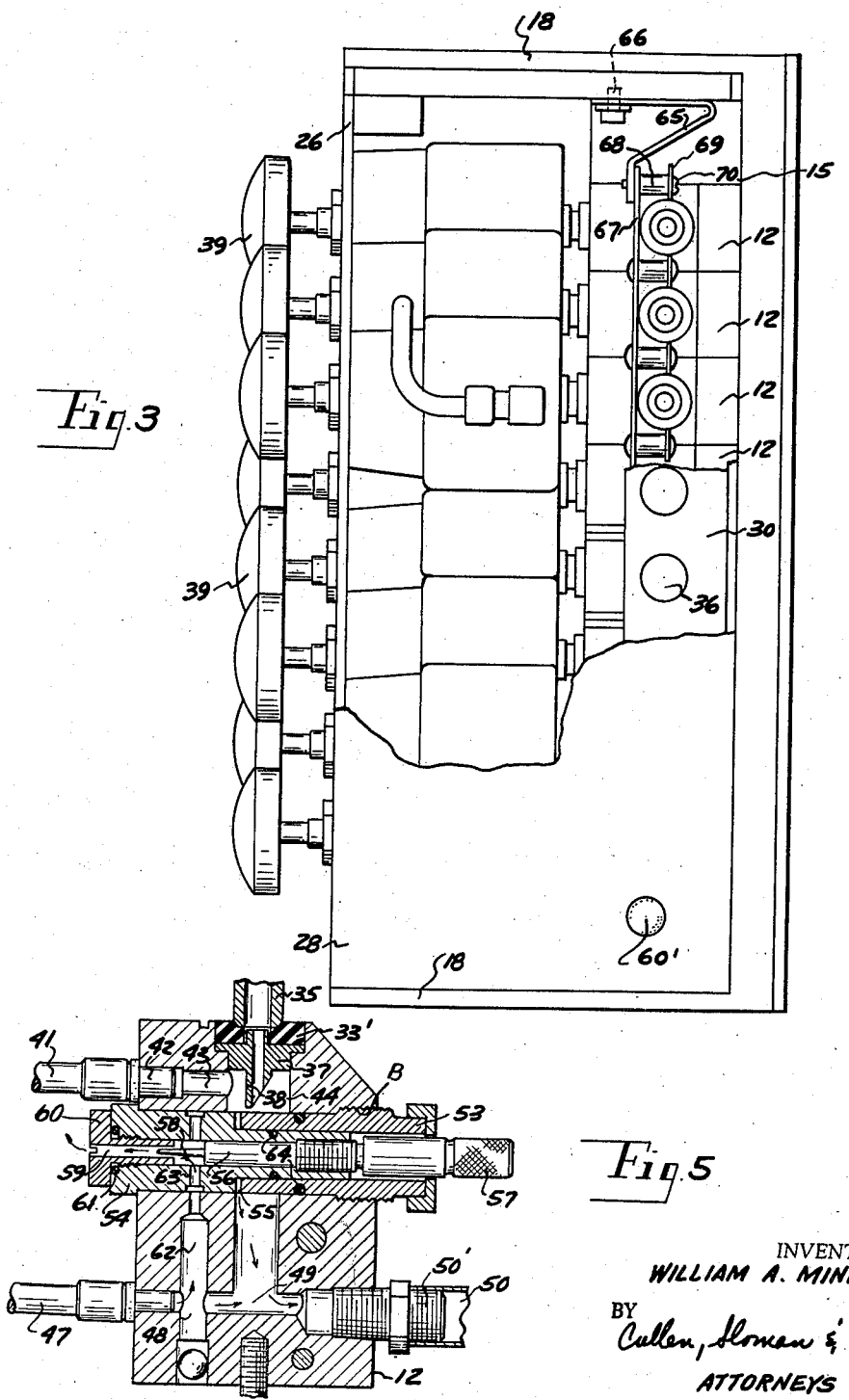

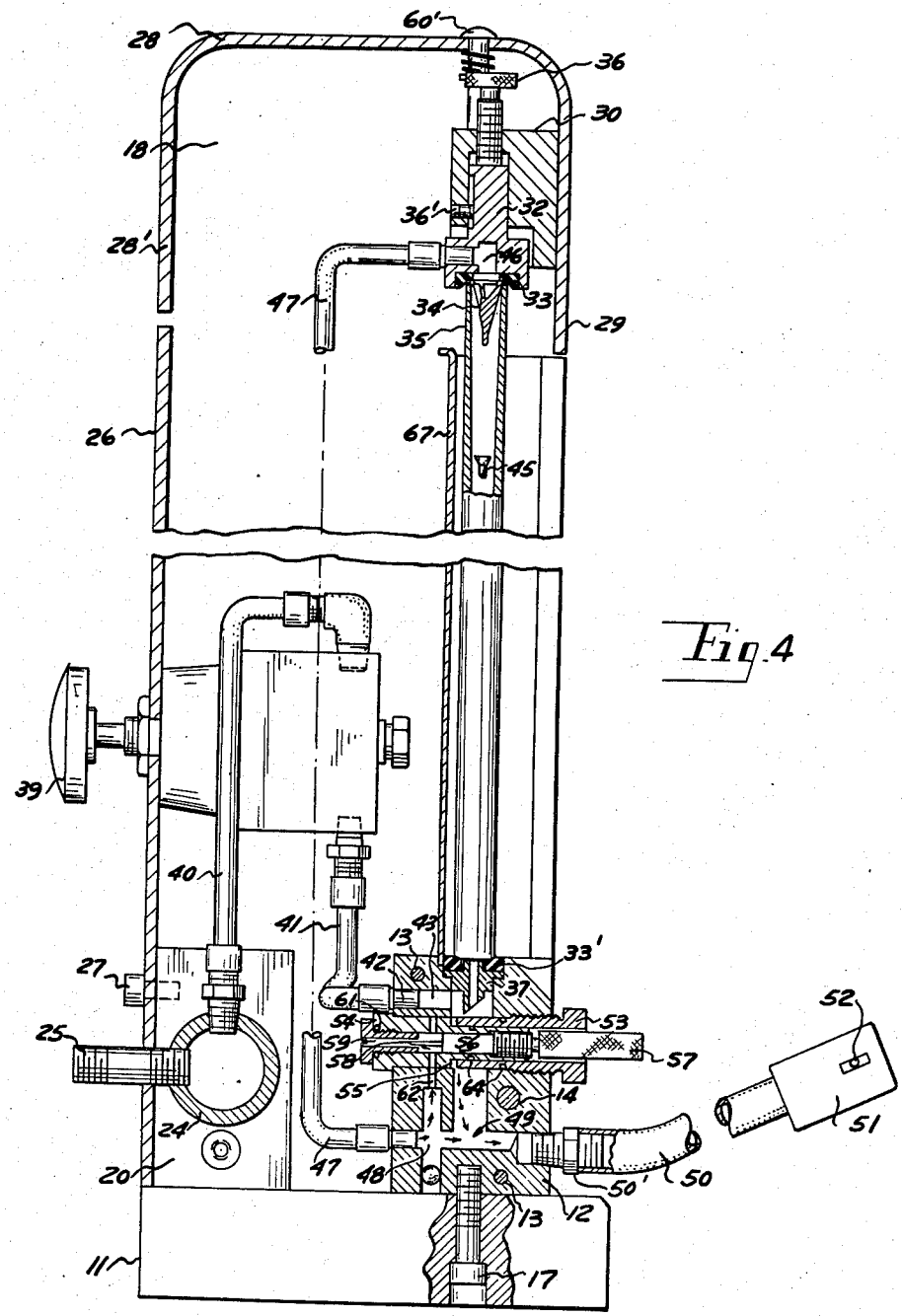

3,170,318
AIR GAGE
William A. Minix, Detroit, Mich., assignor to
Freeland Gauge Company, Detroit, Mich.
Filed June 25, 1963, Ser. No. 290,526
4 Claims. (Cl. 73—37.5)

The present invention relates to an air flow device for gaging bores or the predetermined dimensions of parts, and more particularly to an air flow type of gage having a gaging element providing an air leakage path with respect to the bore of a part or dimension to be gaged and providing a visible indication in an air conduit showing rate of flow as modified by air leakage from the gaging element.

It is a primary object of the present invention to provide an improved air flow device for gaging bores or other predetermined dimensions of parts which incorporates a novel form of valve body and which includes an easily accessible and adjustable by-pass valve within the valve body for controlling and regulating the escape of air from the intake chamber to the delivery chamber of the said valve body for regulating the range of movements of a float, and in turn the amplification or magnification factor of the gaging device.

It is another object to provide an improved form of air bleed valve also arranged within the valve body and concentric with respect to the by-pass valve for easy access and provided for the purpose of regulating the escape of some of the air passing through the delivery chamber controlling back pressure, being in the nature of a float level adjustment factor.

Heretofore, in gaging devices of this type and due to wear of the gaging head from constant use, the amount of air which will escape through the bleed path of the gaging head increases with the result that the magnification or amplification factor of the float within the glass tube becomes decreased. In order to compensate for this, it is another object to provide a by-pass valve which normally by-passes some of the air from the intake chamber directly to the delivery chamber. In order to effectively increase or regulate the range of the float within the glass tube the amount of by-passed air may be increased or decreased.

It is another object in conjunction with said delivery chamber to supply an air bleed valve providing a float adjustment, regulating the level of the float and wherein some of the air which would normally pass through the delivery chamber to the gaging element is bled outwardly of the valve body to atmosphere.

It is another object to provide a novel and improved valve assembly and wherein within a centralized valve body which includes an intake chamber and a delivery chamber connected to the gaging element there is positioned a by-pass valve which in effect by-passes some of the air from the intake chamber which would normally pass through the glass tube, directly to the delivery chamber and to the gaging element.

It is another object to provide air bleed valve concentric with respect to and within said by-pass valve assembly for the purpose of bleeding some of the air from the delivery chamber direct to atmosphere.

It is another object to provide a concentric arrangement between the valve sleeve of the by-pass valve to provide for convenient manual adjustment of both valves successively and by the use of one hand in setting up the gaging device.

It is another object to provide an improved air flow device wherein a plurality of separately operable gaging assemblies are arranged within a single housing, each provided with its own air circuit and each provided with its own air regulator, all connected to a common air manifold.

These and other objects will be seen from the following specification and claims in conjunction with the appended drawings in which:

FIG. 1 is a partly broken away front elevational view of the present air flow gage device providing a plurality of separate indicating columns for a plurality of simultaneous gaging operations.

FIG. 2 is a partly broken away rear elevational view thereof.

FIG. 3 is a partly broken away plan view thereof of an increased scale.

FIG. 4 is a vertical section taken in the direction of lines 4—4 of FIG. 1, on an increased scale.

FIG. 5 is an enlarged section of the valve body in FIG. 4.

It will be understood that the above drawings illustrate merely a preferred embodiment of the invention and that other embodiments are contemplated within the scope of the claims hereafter set forth.

*Air gage housing*

Referring to the drawings, the air gage housing includes the elongated base 11 upon which are mounted a series of laterally engaging valve bodies 12 with end spacers 15, secured to the base by a plurality of cap screws 17, FIGS. 1 and 4. A series of dowels 13 interconnect the respective valve bodies all of which are secured together by tie rod 14 and fastener 16.

Upright side walls 18 are mounted on base 11 at their lower ends and secured by fasteners 19 to spacers 15. As shown in FIG. 2, manifold covers 20 are secured at 21 upon the interior of side walls 18, and include circular bosses 22 which project within opposite ends of air manifold 23, being sealed therein by O-rings 24.

Nipple 25, FIG. 4, provides a means of supplying air under pressure to manifold 23. The housing includes rear wall 26 secured by fasteners 27 to manifold covers 20.

Removable top 28 extends along the upper back portion of the housing as at 28' and includes a depending front wall portion 29.

*Tube support*

The tube support block 30 with end mounting brackets 31 is interposed between side walls 18 and secured thereto by fasteners 31', FIG. 2. The top 28 is secured to the tube support 30 by fasteners 60. Said tube support has therein a series of longitudinally spaced upright bores, FIG. 4, within each of which is movably positioned a tube clamp 32, whose undersurface is recessed to receive gasket 33 recessed to co-operatively receive and retain the upper edge of upright glass tube 35. Clamp screw 36 threads down through tube support 30 and operatively engages clamp 32 which may be further secured by set screw 36'.

While there are provided a series of glass tubes 35, such as the eight tubes shown in FIG. 1, one such assembly is described in detail, since the various gaging assemblies are identical. There is one tube clamp 32 and a corresponding valve body 12 for each tube.

*Valve body*

Valve body 12, FIG. 4, includes a recess in its top surface for seat 37 which mounts gasket 33' cooperatively seating the lower end of tube 35.

Said glass tube is preferably transparent and is of decreasing internal cross sectional area towards its upper end. Seat 37 has an elongated tapered inlet 38 which projects down into intake chamber 44, which has an inlet 43 in body 12.

Source of regulated air pressure

Though a plurality of separately operated pressure regulators are shown at 39, FIGS. 2 and 3, respectively mounted upon rear wall 26, one such regulator is described in connection with FIG. 4. Said pressure regulator is connected with manifold 24 by conduit 40 and is normally set, in the illustrative embodiment of the invention, at approximately 10 to 12 pounds per square inch. Delivery conduit 41 interconnects the pressure regulator and inlet fitting 42 of valve body 12 for supplying air under said predetermined pressure to intake chamber 44 through inlet 43.

The float 45, FIG. 4, is movably positioned within tube 35 and upon the flow of air therethrough will achieve a particular longitudinal positioning depending upon the rate of flow through said tube. The axially arranged bumper 34 is retained at the upper end of said tube and is apertured to permit the passage of air through passage 46 in clamp 32 and out through conduit 47. The bumper limits upward movement of float 45 without disturbing the flow of air.

Conduit 47 returns the air or other fluid to inlet 48 within valve body 12 and to delivery chamber 49. Through fitting 50' said air passes through conduit 50 to gaging element 51 which has one or more orifices 52 permitting the bleeding of air therefrom. Thus, there is provided within each of the valve bodies 12 an intake chamber 44 and a delivery chamber 49, with connected gaging element 51.

By-pass valve assembly

The by-pass valve assembly, FIG. 4, includes the longitudinally aperture valve core 54 which is snugly projected into a bore within the valve body. The by-pass valve includes valve sleeve 53 which is adjustably threaded into valve body 12 and includes at its outer end on the exterior of the body a knob for manual rotation. Inner end portions of valve sleeve 53 extend around valve core 54 with a Teflon plastic seal interposed at 64. Similarly, a Teflon seal 64 is interposed between valve sleeve 53 and valve body 12.

As shown in the drawing, the by-pass valve sleeve 53 has been rotated and moved outwardly partially to provide the by-pass aperture 55 by which some of the air delivered to intake chamber 44 is by-passed into delivery chamber 49 and does not pass upwardly through tube 35. The amount of air or other fluid to be by-passed is regulated by manual rotation of the knob on sleeve 53.

When gage element 51 is new the valve sleeve is normally opened so that a certain amount of air delivered to intake chamber 44 is by-passed directly to gaging element 51. As the gaging element becomes worn, the amount of air leakage through its orifices 52 increases with the result that there is a decrease in the range of visible gaging movements of float 45 within tube 35. In order to increase this range the by-pass is decreased; and this is accomplished by turning the valve sleeve 53 inwardly further closing off by-pass aperture 55.

Air bleed valve

The air bleed valve includes spindle 56 which is rotatively threaded and movably projected within the bore of valve core 54. Said spindle projects axially and concentrically through valve sleeve 53 and outwardly thereof terminates in the knurled head 57 to facilitate adjustment.

The inner end of spindle 56 terminates in the tapered valve element 58 which projects within elongated bore 59 of valve seat 60. The latter is threaded into the outer end of valve core 54 and sealed at 61. Conduit 47 is connected to inlet 48 of delivery chamber, FIG. 4, for supplying air to gaging element 51.

In normal operation air may be bled from inlet 48 of the delivery chamber 49 under the control of air bleed valve 56-57-58. Bore 62 within valve body 12 interconnects the inlet 48 of delivery chamber 49 with passage 63 in valve core 54. This in turn establishes air communication with the bore 59 of valve seat element 60 permitting the regulated flow of air to the atmosphere from delivery chamber 49. The amount of air flow is determined by rotative adjustment of spindle 56—57 and the corresponding valve element 58 with respect to aperture seat 60. This provides a means for adjusting the level of float 45 within the glass tube and in effect is controlling the back pressure or resistance against flow of air through tube 35.

Gage operation

In the present construction and normally where there are a series of bores or other part dimensions to be checked on a work such as the block of an engine or the like there are provided a series of gaging elements 51, one corresponding to each valve body 12, all mounted within the housing.

The operation of one of these air flow gaging elements is described. The air manifold 24, FIG. 4, provides a supply of air under a predetermined pressure which may be used by all of the gaging assemblies. For this purpose there are provided a plurality of pressure regulators 39 mounted upon back wall 26. One such pressure regulator is shown which may be adjusted. In the illustrative embodiment regulator 39 delivers ten-twelve pounds per square inch of air pressure through conduit 41, through inlet 43 to intake chamber 44.

The air or other fluid flows through inlet 38 of seat 37 and up through tube 35, with float 45 therein responding to the movement of air and thus by its position with respect to the length of the tube indicating the rate of flow of air therethrough.

Air flowing through tube 35 passes through opening 46 in clamp 32 and through conduit 47 back to valve body 12 entering delivery chamber 49. Thence, the flow is through conduit 50 to gaging element 51, which has one or more air outlet orifices 52.

In normal operation, for illustration, gage element 51 is projected within the bore in a work piece to be gaged to determine the correctness of internal dimension as being acceptable or rejectable depending upon the amount of air which can bleed out through gage element 51 within the bore to be gaged.

This amount of air which does bleed through the gage element with respect to the bore to be gaged or other part whose dimension is to be gaged has a direct proportional effect upon the flow of air through tube 35. This rate of flow is visibly indicated by the very light movable float 45 which floats on the moving column of air and takes a longitudinal position depending upon such rate of flow.

Measuring scales

In order to visably indicate this effect due to air bleeding through the gage element, there is provided a suitable upright scale 64.

As shown in FIG. 3, there are provided upon the interior of side walls 18 a pair of oppositely arranged brackets 65 secured at 66 for supporting the upright background plate 67 which is arranged behind the series of upright parallel spaced indicating glass tubes 35.

A series of spacers 68 are mounted upon background plate arranged in vertically spaced pairs, and spanning each pair of spacers respectively are the series of upright scales 69 secured to said spacers by fasteners 70. These scales are each arranged laterally adjacent its respective tube 35 to thus permit visibly reading the location of float 45. Said strips are calibrated at 71. These scales are removable and interchangeable as desired to meet a particular specification or for a particular gaging operation.

I claim:

1. In an air flow device for gaging bores or the predetermined dimension of a part, wherein air leakage from a gage element within said bore or relative to such part is visibly measured and compared with air leakage from said gage element within a predetermined master bore or part of predetermined dimension, thus providing a range for the selection or rejection of work pieces; the invention comprising a base, a valve body on the base having an intake chamber and a delivery chamber, an air tube support mounted on the base above the valve body, an upright transparent air flow tube interposed between the valve body and support, an air float movable in said tube, a source of air under regulated pressure connected to the intake chamber for direction through said tube, a conduit delivering air from the tube support to said delivery chamber, a gage element having an orifice, a conduit between said delivery chamber and gage element, a by-pass valve in said valve body communicating with said intake chamber to regulate escape of air from said intake chamber to said delivery chamber for regulating the range of movements of said float and in turn the amplification adjustment of the gage for a predetermined pressure of said air source, an air bleed valve in said valve body communicating with said delivery chamber for regulating escape of air passing therethrough to atmosphere, being a float level adjustment of the gage for a predetermined pressure of said air source, and an upright scale arranged relative to said tube, said bypass valve including a sleeve adjustably threaded into said valve body and a knob on the sleeve on the exterior of the body;

said air bleed valve including a stem concentrically threaded through and adjustable relatively to said sleeve, said stem projecting axially outward of said knob.

2. In an air flow device for gaging bores or the predetermined dimension of a part, wherein air leakage from a gage element within said bore or relative to such part is visibly measured and compared with air leakage from said gage element within a predetermined master bore or part of predetermined dimension, thus providing a range for the selection or rejection of work pieces; the invention comprising a valve body having an intake chamber and a delivery chamber, an air tube support above the valve body, an upright transparent air flow tube interposed between the valve body and the support, an air float movable in said tube, a source of air under regulated pressure connected to the intake chamber for direction through said tube, a conduit delivering air from the tube support to said delivery chamber, a gage element having an orifice, a conduit between said delivery chamber and gage element, a by-pass valve in said valve body communicating with said intake chamber to regulate escape of air from said intake chamber to said delivery chamber for regulating the range of movements of said float and in turn the amplification adjustment of the gage for a predetermined pressure of said air source, an air bleed valve in said valve body communicating with said delivery chamber for regulating escape of air passing therethrough to atmosphere, being a float level adjustment of the gage for a predetermined pressure of said air source, and an upright scale arranged relative to said tube; said by-pass valve including a sleeve adjustably threaded into said valve body and a knob on the sleeve on the exterior of the body; said air bleed valve including a stem concentrically threaded through and adjustable relatively to said sleeve, said stem projecting axially outward of said knob.

3. In an air flow device for gaging bores or the predetermined dimension of a part, wherein air leakage from a gage element within said bore or relative to such part is visibly measured and compared with air leakage from said gage element within a predetermined master bore or part of predetermined dimension, thus providing a range for the selection or rejection of work pieces; the invention comprising a valve body having an intake chamber and a delivery chamber, an air tube support above the valve body, an upright transparent air flow tube interposed between the valve body and the support, an air float movable in said tube, a source of air under regulated pressure connected to the intake chamber for direction through said tube, a conduit delivering air from the tube support to said delivery chamber, a gage element having an orifice, a conduit between said delivery chamber and gage element, a by-pass valve in said valve body communicating with said intake chamber to regulate escape of air from said intake chamber to said delivery chamber for regulating the range of movements of said float and in turn the amplification adjustment of the gage for a predetermined pressure of said air source, an air bleed valve in said valve body communicating with said delivery chamber for regulating escape of air passing therethrough to atmosphere, being a float level adjustment of the gage for a predetermined pressure of said air source, and an upright scale arranged relative to said tube; said valve body having a transverse bore containing at its rear end a by-pass valve core and at its forward end a by-pass valve sleeve, the sleeve being adjustably threaded into said bore to and from the core to control air flow in the by-pass valve, with the sleeve having a forwardly accessible knob on the exterior of the body;

said core containing a bleed valve seat at its rear end and said sleeve containing a stem concentrically threaded through it and adjustable relatively to said sleeve to and from the seat to control air flow in the bleed valve, with the stem projecting axially outward of said knob.

4. Means according to claim 3 wherein the core and the seat have enlarged ends exposed to the exterior of the valve body at the rear end of the bore.

References Cited by the Examiner
UNITED STATES PATENTS

| | | | |
|---|---|---|---|
| 2,749,742 | 6/56 | Aller | 73—37.9 |
| 2,963,901 | 12/60 | Aller | 73—37.5 |

ISAAC LISANN, *Primary Examiner.*